United States Patent
Wang

(10) Patent No.: US 8,690,506 B2
(45) Date of Patent: Apr. 8, 2014

(54) QUICK ASSEMBLY APPARATUS

(75) Inventor: Ting-Jui Wang, New Taipei (TW)

(73) Assignee: Dtech Precision Industries Co., Ltd. (TW)

( * ) Notice: Subject to any disclaimer, the term of this patent is extended or adjusted under 35 U.S.C. 154(b) by 135 days.

(21) Appl. No.: 13/305,905

(22) Filed: Nov. 29, 2011

(65) Prior Publication Data

US 2012/0148339 A1 Jun. 14, 2012

(30) Foreign Application Priority Data

Dec. 9, 2010 (TW) ................................ 99142960 A

(51) Int. Cl.
*F16B 13/08* (2006.01)
*F16B 13/12* (2006.01)

(52) U.S. Cl.
CPC .................................... *F16B 13/128* (2013.01)
USPC .................................. 411/347; 411/45; 24/435

(58) Field of Classification Search
USPC ................. 411/45–48, 347, 348; 24/453, 458
See application file for complete search history.

(56) References Cited

U.S. PATENT DOCUMENTS

| | | | | | |
|---|---|---|---|---|---|
| 4,821,381 | A | * | 4/1989 | Kaneko et al. | 24/297 |
| 5,100,272 | A | * | 3/1992 | Jadoul et al. | 411/45 |
| 5,562,375 | A | * | 10/1996 | Jackson | 411/48 |
| 6,884,013 | B2 | * | 4/2005 | Kiviranta et al. | 411/348 |

* cited by examiner

*Primary Examiner* — Flemming Saether
(74) *Attorney, Agent, or Firm* — Schmeiser, Olsen & Watts, LLP

(57) ABSTRACT

A quick assembly apparatus includes a fastening unit, a control unit and an elasticity unit. The fastening unit includes a head section and a fastening section, a through channel connecting the head section and the fastening section, and a notch at the fastening section to form a plurality of elastic fastening elements. The control unit is movably inserted in the through channel, includes a supporting section supporting the elastic fastening elements, a control shaft connected with the supporting section and extending out from the fastening section, and an extension shaft connected with the supporting section and extending towards the head section. The elasticity unit is fitted around the extension shaft of the control unit, and has its one end pushed against the control unit and its another end pushed against the fastening unit. Accordingly, the quick assembly apparatus is capable of quickly and steadily assembling two plates.

9 Claims, 9 Drawing Sheets

QUICK ASSEMBLY APPARATUS

CROSS-REFERENCE TO RELATED APPLICATION

This non-provisional application claims priority under 35 U.S.C. §119(a) on Patent Application No(s). 099142960 filed in Taiwan, R.O.C. on Dec. 9, 2010, the entire contents of which are hereby incorporated by reference.

FIELD OF TECHNOLOGY

The present invention relates to a quick assembly apparatus, and more particularly, to an apparatus capable of quickly assembling and steadily engaging two plates.

BACKGROUND

A technical feature of a screw thread structure is often adopted by a conventional fastening unit for engaging two plates, which generally comprises a screw, a cap and a sleeve. The screw comprises an end as a force receiving section provided with a screw groove, and another end comprising a screw rod connected with the force receiving section. The cap is fitted around a hollow cylinder about the force receiving section for encapsulating and protecting the screw. The sleeve is fitted around the screw rod. Accordingly, the above fastening unit is first engaged to a first plate by the sleeve, and the first and second plates are aligned with each other after moving the first plate, such that the screw rod of the screw corresponds to fastening openings of the first and second plates. Next, a rotational force is applied to the screw groove of the force receiving section of the screw with the aid of a tool, so as to fasten the screw rod into the fastening opening of the second plate and complete the assembly of the two plates. The above conventional screw thread structure is indeed capable of assembling two plates; however, it involves a more complicated assembling process since an external rotational force needs to be applied to the screw groove of the force receiving section of the screw with a tool for assembling.

SUMMARY

Therefore, in view of the above shortcomings of the conventional techniques associated with the prior art, there is a need for a quick assembly apparatus capable of quickly assembling and steadily engaging two plates.

It is an object of the present invention to provide a quick assembly apparatus. With an improved structure comprising a fastening unit, a control unit and an elasticity unit, the quick assembly apparatus is capable of quickly assembling and steadily fastening two plates.

A quick assembly apparatus according to a first embodiment of the present invention comprises: a fastening unit, comprising a head section at one end thereof and a fastening section at another end thereof, a through channel connecting the head section and the fastening section, and a notch at the fastening section to form a plurality of elastic fastening elements; a control unit, movably inserted in the through channel of the fastening unit, comprising a supporting section corresponding to and supporting in the elastic fastening elements, a control shaft connected to the supporting section and extending out from the fastening section, and an extension shaft connected to the supporting section, extending towards the head section and having an end blocked outside the head section; and an elasticity unit, fitted around the extension shaft of the control unit, having one end thereof pushed against the control unit and another end thereof pushed against the fastening unit.

A quick assembly apparatus according to a second embodiment of the present invention comprises: a fastening unit, comprising a head section at one end thereof and a fastening section at another end thereof, a through channel connecting the head section and the fastening section, and a notch at the fastening section to form a plurality of elastic fastening elements; a control unit, movably inserted in the through channel of the fastening unit, comprising a supporting section corresponding to and supporting in the elastic fastening elements, and an extension shaft connected to the supporting section, extending towards the head section and having an end provided with a pull section for blocking outside the head section; and an elasticity unit, fitted around the extension shaft of the control unit, having one end thereof pushed against the control unit and another end thereof pushed against the fastening unit.

To apply the quick assembly apparatus of the present invention, the control shaft of the control unit can be pressed or the extension shaft of the control unit can be pulled to axially move the control unit to further disengage the supporting section from the inner sides of the elastic fastening elements. Thus, the elastic fastening elements are shrunken to a reduced diameter to pass through openings of a first plate and a second plate or to pass through the opening of the second plate after being engaged with the first plate, thereby assembling the first plate with the second plate. Next, by pressing the control shaft of the control unit or pulling the extension shaft of the control unit, the elastic fastening elements is similarly shrunken to a reduced diameter to disengage the second plate and the first plate from each other. Therefore, the quick assembly apparatus of the present invention is capable of quickly assembling and steadily fastening two plates.

BRIEF DESCRIPTION

The present invention will become more readily apparent to those ordinarily skilled in the art after reviewing the following detailed description and accompanying drawings, in which.

DETAILED DESCRIPTION

Figure 1:
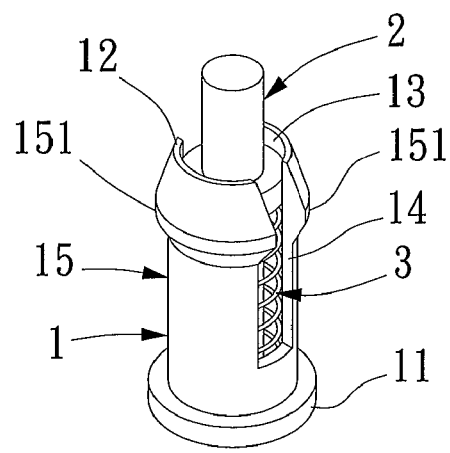
FIG. 1 is a perspective view according to a first embodiment of the present invention.
Figure 2:
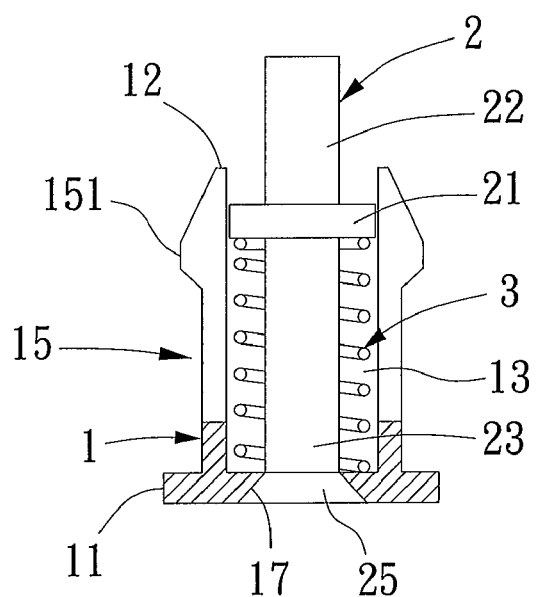
FIG. 2 is a sectional view according to the first embodiment of the present invention.
Figure 5:
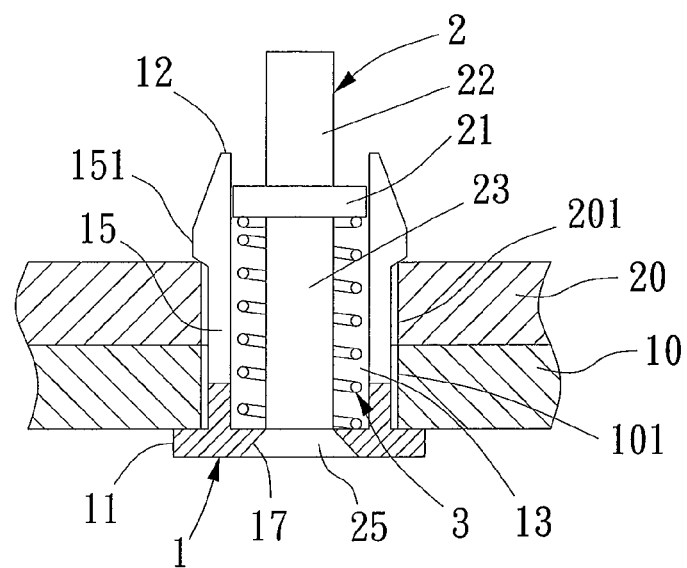
FIG. 5 is a schematic diagram depicting application operations according to the first embodiment of the present invention.

Referring to FIGS. 1, 2 and 5, a quick assembly apparatus according to a first embodiment of the present invention comprises a fastening unit 1, a control unit 2 and an elasticity unit 3.

Figure 3:
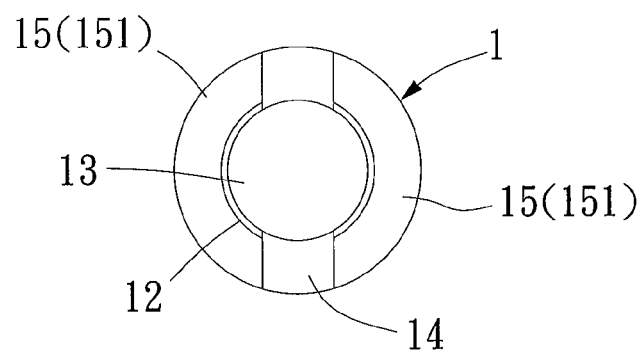
FIG. 3 is an end view of an elastic fastening element according to the first embodiment of the present invention.
Figure 4:
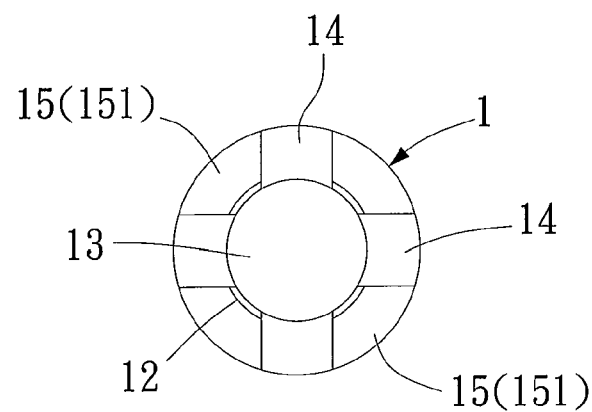
FIG. 4 is an end view of another elastic fastening element according to the first embodiment of the present invention.

The fastening unit 1 is a hollow cylinder, and comprises: a head section 11 at one end thereof and a fastening section 12 at another end thereof; a through channel 13, connecting the head section 11 and the fastening section 12; a notch 14 at the fastening section 12, axially extending from an end of the fastening unit 1, and forming an I-shaped or a cross-shaped arrangement; and at least two elastic fastening elements 15 (as shown in FIGS. 3 and 4), each having an outer side and an inner side, with the outer side being provided with a protruding fastening section 151 for fastening with an opening of a plate.

The control unit 2 is movably inserted in the through channel 13 of the fastening unit 1, and comprises: a supporting section 21, corresponding to and supporting the inner sides of the elastic fastening elements 15; a control shaft 22, connected to a center of the supporting section 21 and extending out from the fastening section 12; and an extension shaft 23, connected to the center of the supporting section 21 and extending towards the head section 11, and having an end axially blocked outside the head section 11.

The elasticity unit 3 is a spiral spring and is fitted around the extension shaft 23 of the control unit 2, such that the elasticity unit 3 has one end pushing towards the supporting section 21 of the control unit 2 and another end pushing towards the head section 11 of the fastening unit 1.

Figure 6:
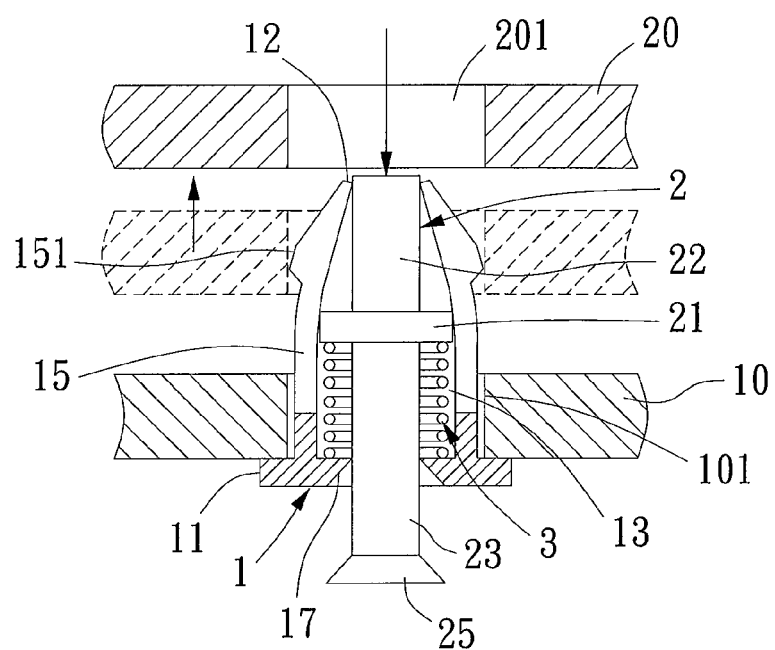
FIG. 6 is another schematic diagram depicting application operations according to the first embodiment of the present invention.

As illustrated, the fastening unit 1, the control unit 2 and the elasticity unit 3 form a novel structure of the quick assembly apparatus having distinct technical features and improved combination relationships according to the first embodiment of the present invention. Referring to FIGS. 5 and 6, to apply the present invention, the control shaft 22 of the control unit 2 is pressed to axially move the control unit 2 and disengage the supporting section 21 from the inner sides of the elastic fastening elements 15. Accordingly, the elastic fastening elements 15 are shrunken to a reduced diameter to pass through an opening 101 of a first plate 10 and an opening 201 of a second plate 20, thereby connecting the first plate 10 and the second plate 20. By pressing the control shaft 22 of the control unit 2 again, the diameter of the elastic fastening elements 15 is similarly reduced to further disengage the second plate 20 and the first plate 10 from each other.

Based on the technical features of the first embodiment, in another embodiment of the present invention, an inner wall of the through channel 13 near the head section 11 of the fastening unit 1 is provided with a first stopping section 17 for binding an axial movement range of the control unit 2. The extension shaft 23 of the control unit 2 further comprises a second stopping section 25 for axially blocking outside the first stopping section 17 of the fastening unit 1. Thus, one end of the elasticity unit 3 is supported at the supporting section 21 of the control unit 2 while the other end is supported in the first stopping section 17 of the fastening unit 1.

Figure 8:
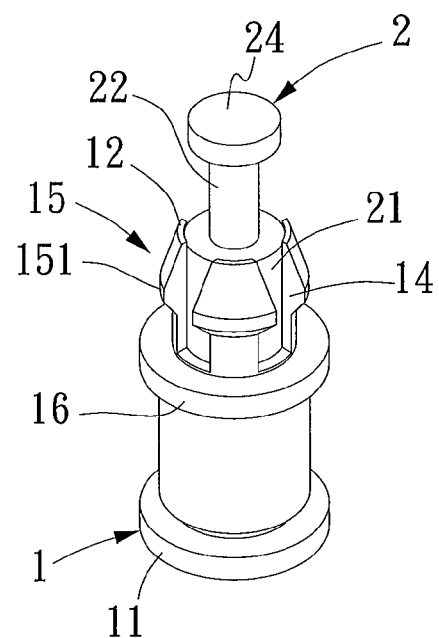
FIG. 8 is a perspective view of other associated components according to the first embodiment of the present invention.
Figure 9:
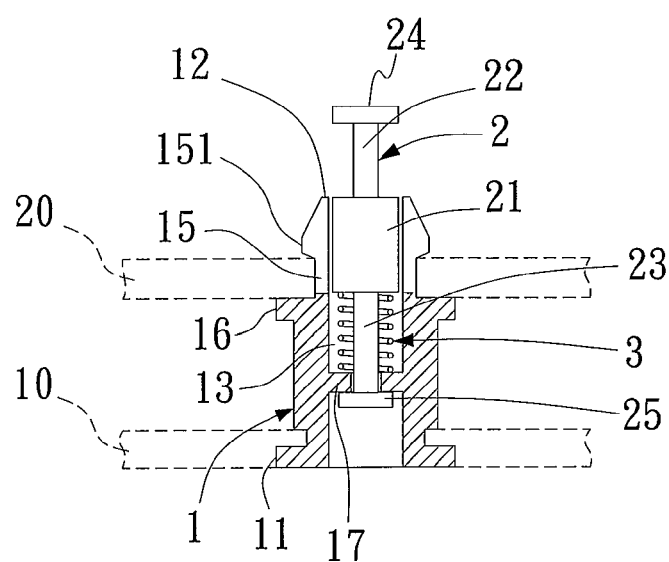
FIG. 9 is another sectional view of other associated components according to the first embodiment of the present invention.

Referring to FIGS. 8 and 9, based on the technical features of the first embodiment, in another embodiment of the present invention, the head section 11 of the fastening unit 1 may be implemented as a structure assembled to the first plate 10 by riveting, welding or dilated connection, for example. The fastening unit 1 further comprises a restrictive protruding section 16 at its periphery near the elastic fastening elements 15, such that the second plate 20 is limited between the restrictive protruding section 16 and the protruding fastening section 151 when the second plate 20 is fastened by the elastic fastening elements 15. Further, an inner wall of the through channel 13 near the head section 11 of the fastening unit 1 is provided with a first stopping section 17 for binding an axial movement range of the control unit 2. The extension shaft 23 of the control unit 2 further comprises a second stopping section 25 for axially blocking outside the first stopping section 17 of the fastening unit 1. Thus, one end of the elasticity unit 3 is supported at the supporting section 21 of the control unit 2 while the other end is supported in the first stopping section 17 of the fastening unit 1.

Figure 7:
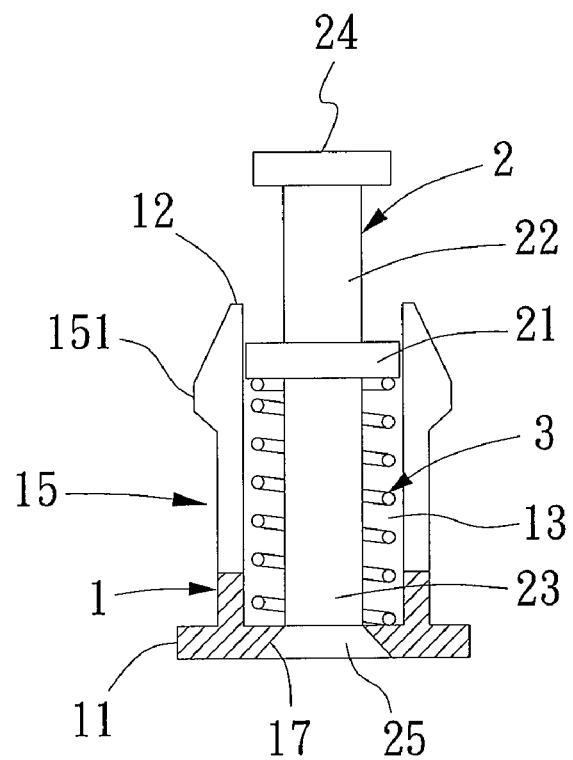
FIG. 7 is a sectional view of other associated components according to the first embodiment of the present invention.

Referring to FIGS. 7 and 9, based on the technical features of the first embodiment, in another embodiment of the present invention, the control shaft 22 of the control unit 2 further comprises at its one end a pressing section 24 having a diameter larger than that of the control shaft 22 to facilitate pressing upon the control unit 2.

Figure 10:
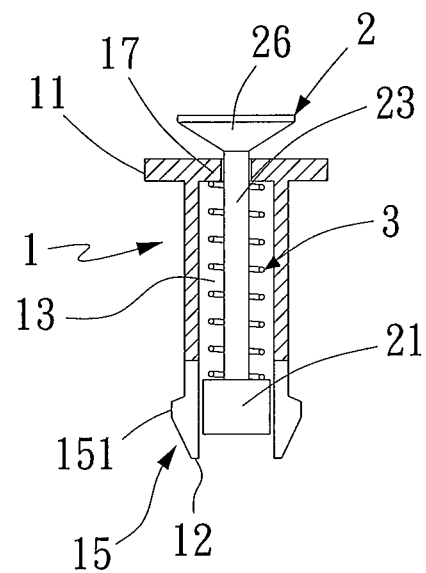
FIG. 10 is a sectional view according to a second embodiment of the present invention.

Referring to FIG. 10, a quick assembly apparatus according to a second embodiment of the present invention comprises a fastening unit 1, a control unit 2 and an elasticity unit 3.

The fastening unit 1, having a structure identical to that of the first embodiment, comprises a head section 11, a fastening section 12, a through channel 13, a notch 14, a plurality of elastic fastening elements 15 and a protruding fastening section 151. Each of the elastic fastening elements 15 comprises an inner side and an outer side, with the protruding fastening section 151 being located at the outer side for fastening to an opening of a plate.

The control unit 2, being movably inserted in the through channel 13 of the fastening unit 1, comprises a supporting section 21 corresponding to and supporting the inner sides of the elastic fastening elements 15, and an extension shaft 23 connected to the supporting section 21 and extending towards the head section 11. The extension shaft 23 comprises at its one end a pull section 26 having a diameter larger than that of the extension shaft 23 to not only block the head section 11 but also facilitate pulling of the control unit 2.

The elasticity unit 3 is a spiral spring and is fitted around the extension shaft 23 of the control unit 2, such that the elasticity unit 3 has one end pushing towards the supporting section 21 of the control unit 2 and another end pushing towards the head section 11 of the fastening unit 1.

Figure 11:
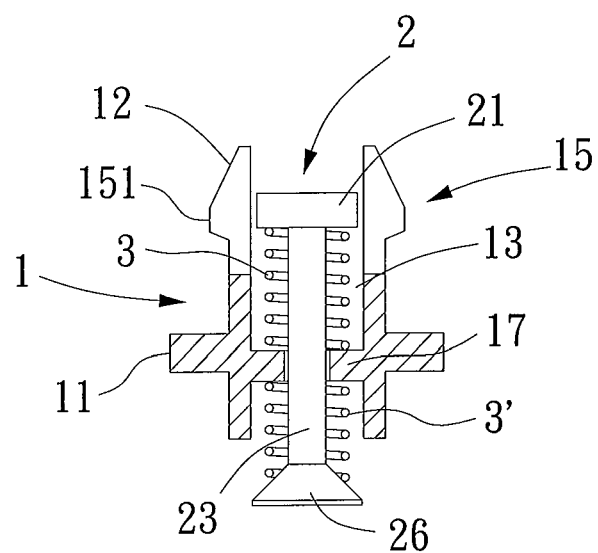
FIG. 11 is a sectional view of other associated components according to the second embodiment of the present invention.

Referring to FIG. 11, based on the technical features of the first embodiment, the quick assembly apparatus according to another embodiment of the present invention further comprises another elasticity unit 3'. The extension shaft 23 extends out from the head section 11, and the another elasticity unit 3' is fitted around the extension shaft 23 and is located outside the head section 11. Furthermore, the another elasticity unit 3' has one end pushed against the pull section 26 and another end blocked outside the head section 11.

Based on the technical features of the second embodiment, in another embodiment of the present invention, an inner wall of the through channel 13 near the head section 11 of the fastening unit 1 is provided with a first stopping section 17. The pull section 26 is blocked outside the first stopping section 17. One end of the elasticity unit 3 is supported at the supporting section 21 of the control unit 2 while the other end is supported in the first stopping section 17 of the fastening unit 1.

Figure 12:
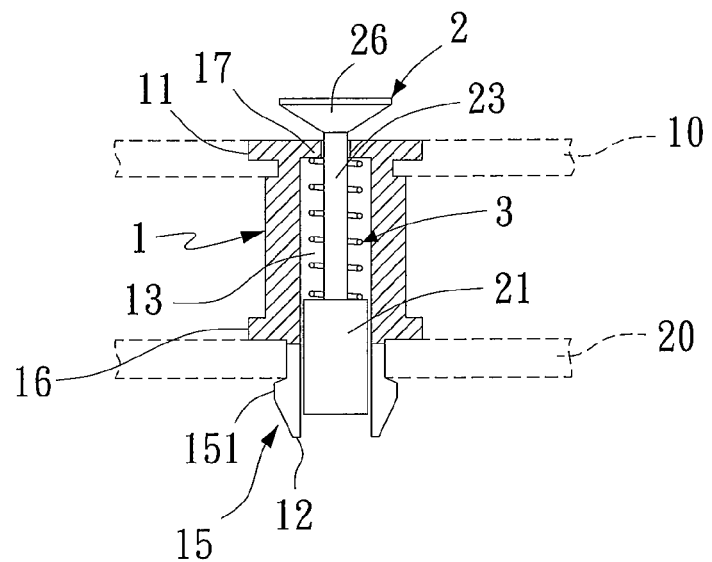
FIG. 12 is a sectional view of other associated components and a schematic view depicting application operations according to the second embodiment of the present invention.
Figure 13:
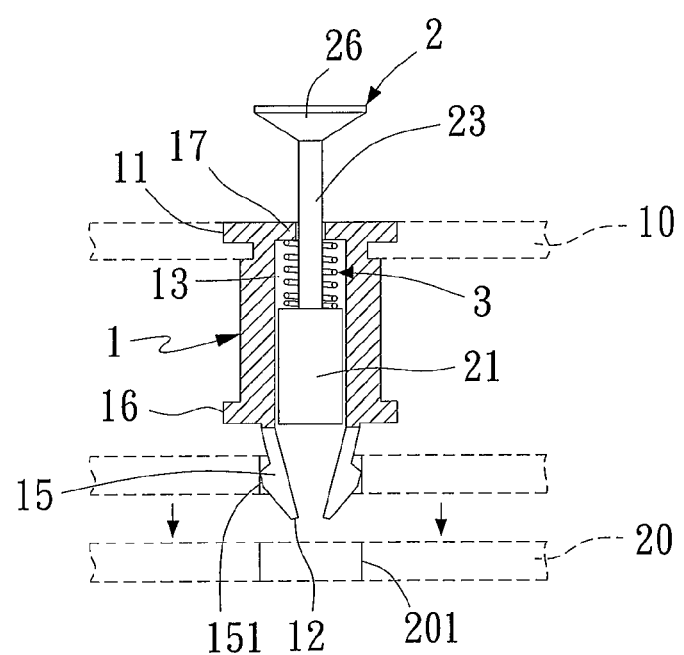
FIG. 13 is a sectional view of other associated components and another schematic view depicting application operations according to the second embodiment of the present invention.

Referring to FIGS. 12 and 13, based on the technical features of the second embodiment, in another embodiment of the present invention, the head section 11 of the fastening unit 1 may be implemented as a structure assembled to the first plate 10 by riveting, welding or dilated connection, for example. The fastening unit 1 further comprises a restrictive protruding section 16 at its periphery near the elastic fastening elements 15, such that the second plate 20 is limited between the restrictive protruding section 16 and the protruding fastening section 151 when the second plate 20 is fastened by the elastic fastening elements 15. Furthermore, an inner wall of the through channel 13 near the head section 11 of the fastening unit 1 is similarly provided with a first stopping section 17 for binding an axial movement range of the control unit 2. In addition, the pull section 26 of the present invention is blocked outside the first stopping section 17, such that one end of the elasticity unit 3 fitted around the extension shaft 23 is supported at the supporting section 21 of the control unit 2 while the other end is supported in the first stopping section 17 of the fastening unit 1.

As illustrated, the fastening unit 1, the control unit 2 and the elasticity unit 3 form a novel structure of the quick assembly apparatus having distinct technical features and improved combination relationships according to the second embodiment of the present invention.

Figure 14:
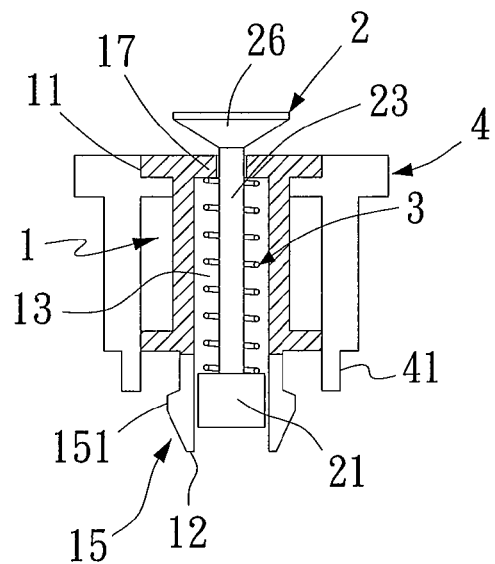
FIG. 14 is a sectional view of other associated components according to the second embodiment of the present invention.

Referring to FIG. 14, based on the technical features of the second embodiment, the quick assembly apparatus according to another embodiment of the present invention further comprises a sleeve 4. The sleeve 4 is fitted around the fastening unit 1, and has one end engaged with the head section 11 and the other end towards the fastening section 12 provided with an engaging section 41.

Figure 15:
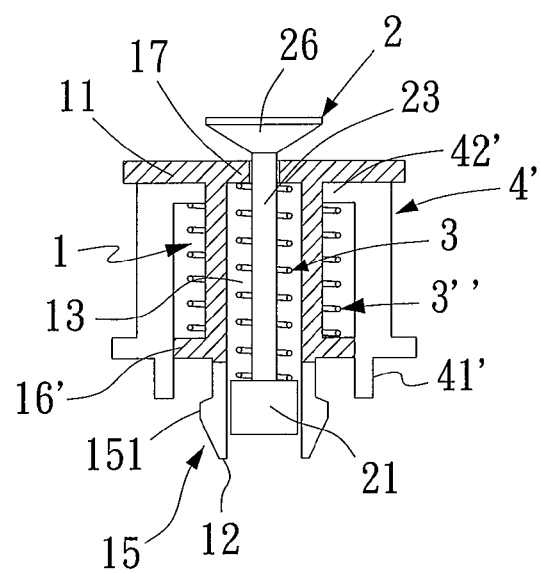
FIG. 15 is a sectional view of other associated components according to the second embodiment of the present invention.

Referring to FIG. 15, based on the technical features of the second embodiment, the quick assembly apparatus according to another embodiment of the present invention further comprises a sleeve 4' and another elasticity unit 3". The sleeve 4' is movably fitted around the fastening unit 1, and comprises a shrunken stopping section 42' at its one end. The fastening unit 1 comprises a protruding section 16' at a periphery between its two ends. The stopping section 42' is located between the head section 11 and the protruding section 16'. The another elasticity unit 3" has two ends pushed against the stopping section 42' and the protruding section 16', respectively. The sleeve 4' further comprises an engaging section 41' at its one end towards the fastening section 12.

Figure 16:
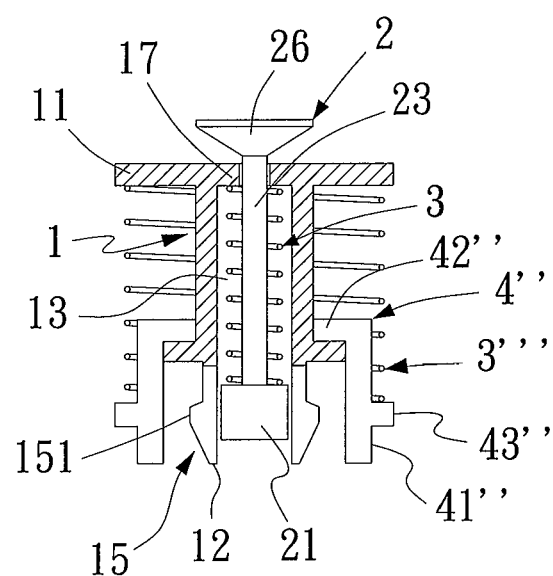
FIG. 16 is a sectional view of other associated components according to the second embodiment of the present invention.

Referring to FIG. 16, based on the technical features of the second embodiment, the quick assembly apparatus according to another embodiment of the present invention further comprises a sleeve 4" and another elasticity unit 3'". The sleeve 4" is movably fitted around the fastening unit 1, and comprises a stopping section 42" at its one end and another stopping section 43" at its another end towards the fastening section 12. The stopping section 42" is pushed against the fastening unit 1. The another elasticity unit 3'" has two ends pushed against the head section 11 and the another stopping section 43'", respectively. The sleeve 4" further comprises an engaging section 41" at its one end towards the fastening section 12.

Based on the technical features of the second embodiment, the engaging sections 41, 41' and 41" in the embodiments of the present invention are engaged with a first plate (not shown) by riveting, welding or dilated connection, for example.

With the above embodiments, it is illustrated that the present invention provides a novel quick assembly apparatus offering many advantages. Through the combination of the fastening unit, the control unit and the elasticity unit, the quick assembly apparatus of the present invention is capable of quickly assembling and steadily fastening two plates to not only offer outstanding industrial utilization practicability but also meet market requirements.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A quick assembly apparatus, comprising:
    a fastening unit, comprising a head section at one end thereof and a fastening section at another end thereof, a through channel connecting the head section and the fastening section, and a notch at the fastening section to form a plurality of elastic fastening elements;
    a control unit, movably inserted in the through channel of the fastening unit, comprising a supporting section corresponding to and supporting in the elastic fastening elements, a control shaft connected to the supporting section and extending out from the fastening section, and an extension shaft connected to the supporting section, extending towards the head section and having an end blocked outside the head section; and
    an elasticity unit, fitted around the extension shaft of the control unit, having one end thereof pushed against the control unit and another end thereof pushed against the fastening unit.

2. The quick assembly apparatus as claimed in claim 1, wherein each of the elastic fastening elements of the fastening unit comprises an outer side and an inner side, the outer side comprises a protruding fastening section, and the supporting section of the control unit is supported against the inner sides of the elastic fastening elements.

3. The quick assembly apparatus as claimed in claim 1, wherein the head section of the fastening unit is used for engaging with a first plate by means of riveting, welding or dilated connection.

4. The quick assembly apparatus as claimed in claim 3, wherein the fastening unit further comprises a restrictive protruding section at a periphery thereof near the elastic fastening elements, and a second plate is limited between the restrictive protruding section and the protruding fastening section.

5. The quick assembly apparatus as claimed in claim 4, wherein the through channel of the fastening unit comprises a first stopping section at an inner wall thereof near the head section, the extension shaft of the control unit comprises a second stopping section for axially blocking outside the first stopping section of the fastening unit, and one end of the elasticity unit is supported at the supporting section of the control unit while the other end is supported in the first stopping section of the fastening unit.

6. The quick assembly apparatus as claimed in claim 5, wherein the control shaft of the control unit comprises a pressing section at an end thereof.

7. The quick assembly apparatus as claimed in claim 1, wherein the through channel of the fastening unit comprises a first stopping section at an inner wall thereof near the head section, the extension shaft of the control unit comprises a second stopping section for axially blocking outside the first stopping section of the fastening unit, and one end of the elasticity unit is supported at the supporting section of the control unit while the other end is supported in the first stopping section of the fastening unit.

8. The quick assembly apparatus as claimed in claim 7, wherein the control shaft of the control unit comprises a pressing section at an end thereof.

9. The quick assembly apparatus as claimed in claim 1, wherein the control shaft of the control unit comprises a pressing section at an end thereof.

* * * * *